United States Patent
Feehrer et al.

(10) Patent No.: US 9,582,346 B2
(45) Date of Patent: Feb. 28, 2017

(54) SELECTING I/O INTERRUPT TARGET FOR MULTI-CORE SERVER SYSTEMS

(71) Applicant: Oracle International Corporation, Redwood City, CA (US)

(72) Inventors: John Ross Feehrer, Westford, MA (US); Ryan Benjamin Olivastri, Boston, MA (US); Patrick Francis Stabile, Everett, MA (US)

(73) Assignee: Oracle International Corporation, Redwood City, CA (US)

( * ) Notice: Subject to any disclaimer, the term of this patent is extended or adjusted under 35 U.S.C. 154(b) by 753 days.

(21) Appl. No.: 14/017,974

(22) Filed: Sep. 4, 2013

(65) Prior Publication Data

US 2015/0067217 A1    Mar. 5, 2015

(51) Int. Cl.
*G06F 13/24* (2006.01)
*G06F 11/07* (2006.01)

(52) U.S. Cl.
CPC ...... *G06F 11/0709* (2013.01); *G06F 11/0793* (2013.01)

(58) Field of Classification Search
CPC ............. G06F 13/24; G06F 2213/2418; G06F 13/1605; G05B 2219/13001
USPC .......... 710/260–266, 200, 240–244; 714/726
See application file for complete search history.

(56) References Cited

U.S. PATENT DOCUMENTS

| | | | |
|---|---|---|---|
| 2009/0172423 A1* | 7/2009 | Song | G06F 1/3203 713/300 |
| 2009/0307535 A1* | 12/2009 | Hataida | G06F 11/073 714/48 |
| 2014/0156905 A1* | 6/2014 | Butcher | G06F 13/36 710/315 |

* cited by examiner

*Primary Examiner* — Tim T Vo
*Assistant Examiner* — Kim T. Huynh
(74) *Attorney, Agent, or Firm* — Polsinelli PC

(57) ABSTRACT

Implementations of the present disclosure involve a system and/or method for handling errors in a multi-node commercial computing system running a number of guest applications simultaneously. In particular, the system and/or method provides the ability to program on a per-error basis the destination within the system for an interrupt based on an I/O error, the ability to provision for multiple/redundant error reporting paths for a class of more severe errors and/or distributed set of error status and log registers to aid software in narrowing down the source of an error that triggered the interrupt. In addition, the system provides for dynamically altering the destination of the error handling in response to one or more operating conditions of the system. Such flexibility in the system provides for a more robust error handling without impacting the performance of the multi-node computing system.

20 Claims, 5 Drawing Sheets

SELECTING I/O INTERRUPT TARGET FOR MULTI-CORE SERVER SYSTEMS

FIELD OF THE DISCLOSURE

Aspects of the present invention relate to computing systems and, more particularly, aspects of the present invention involve selection of a target component for an I/O interrupt in a multi-node server system.

BACKGROUND

Computers or other executing devices are ubiquitous in today's society. They come in all different varieties and can be found in places such as automobiles, laptops or home personal computers, banks, personal digital assistants, cell phones, as well as many businesses. One particular example of such an executing device is a multi-node, high-performance server used in a business for enterprise computing. Such servers allow for multiple Guest Operating Systems (GOSs) to share the hardware and processing power of the server to minimize the cost of executing multiple software applications such as online transaction processing, database operations, analytics and web hosting. However, because many GOSs may be operating simultaneously, errors occurring the system are typically plentiful and require quick and careful handling so that such errors do not impact the operation of all of the GOSs of the system.

In handling errors in the system, the server attempts to minimize any downtime and contain any bad data from infecting other components of the system, providing enough information such that the error can be diagnosed and isolated and limiting the effects of an error to a single GOS on other components of the system and/or other GOSs operating on the system. One approach to error handling within the server system is to dedicate a separate Service Processor for housekeeping, system initialization, environmental monitoring and error handling. The Service Processor is typically operates out-of-band communicating with the server over a low-speed path. Thus, in systems with many errors, the Service Processor may act as a bottleneck to the system as the lower-speed processor attempts to handle the errors and related interrupt sequence to address the errors. Similar bottlenecks can occur if the interrupts are handled by a specific dedicated node/core/thread.

It is with these and other issues in mind that various aspects of the present disclosure were developed.

SUMMARY

One implementation of the present disclosure may take the form of a multi-node computing device. The computing device may comprise a plurality of processing nodes, each processing node comprising a plurality of processing cores, a service processor in communication with at least one of the plurality of processing nodes and an input/output (I/O) hub electrically connected to the at least one of the plurality of processing nodes and the service processor and configured to connect to at least one external component of the I/O. The I/O hub includes a status register configured to store a plurality of error status messages, wherein each of the plurality of error status messages corresponds to one of a plurality of components of the I/O hub and an interrupt steering register configured to store a plurality of indicators of a destination component for transmission of an interrupt signal. Further, each of the plurality of indicators corresponds to one of the error status messages stored in the status register and each of the plurality of indicators of a destination component indicates the service processor or the at least one of the plurality of processing nodes based at least on the corresponding one of the error status messages of the status register.

Another implementation of the present disclosure may take the form of a method for error handling in a multi-node computing device. The method may include the operations of receiving an error status message from a component of the multi-node computing device, the error status comprising a bit string with at least one asserted bit indicating a type of error in the component of the multi-node computing device and storing the status message from the component in an error status register, the error status register comprising a plurality of entries and wherein each entry in the error status register corresponds to component of the multi-node computing device. Additionally, the method includes the operations of obtaining a destination component for transmission of an interrupt signal from a interrupt steering register configured to store a plurality of indicators of a destination component, wherein each of the plurality of indicators corresponds to one of the plurality of entries in the status register and each of the plurality of indicators of a destination component indicates a service processor component or a specific processing node of the multi-node computing device based at least on the status messages from the possible destination components and transmitting the interrupt signal to the destination component.

DETAILED DESCRIPTION

Implementations of the present disclosure involve a system and/or method for handling errors in a multi-node computing system. In particular, the system and/or method provides the ability to program on a per-error basis the destination within the system for an interrupt based on an I/O error, the ability to provision for multiple/redundant error reporting paths for a class of more severe errors and/or distributed set of error status and log registers to aid software in narrowing down the source of an error that triggered the interrupt. Such flexibility in the system provides for a more robust error handling without impacting the performance of the multi-node computing system.

In one particular embodiment of the present disclosure, the I/O subsystem of the multi-node computing system is given control over I/O error interrupt steering. In other words, the system is allowed to select where an error interrupt is transmitted based on which type of error occurs. The programmability of the interrupt steering allows the error interrupt processing load to be distributed and balanced among multiple processors and threads capable of handling error interrupts, including between a service processor and the multiple microprocessor nodes of the multi-node system. The interrupt steering is accomplished through one or more registers included in a service processor unit (SPU) of the I/O subsystem of the multimode computing system. Through the information stored in the registers, a target component or core can be identified for handling different types of errors of the system to lessen the impact of said errors on the multi-node system.

Figure 1:
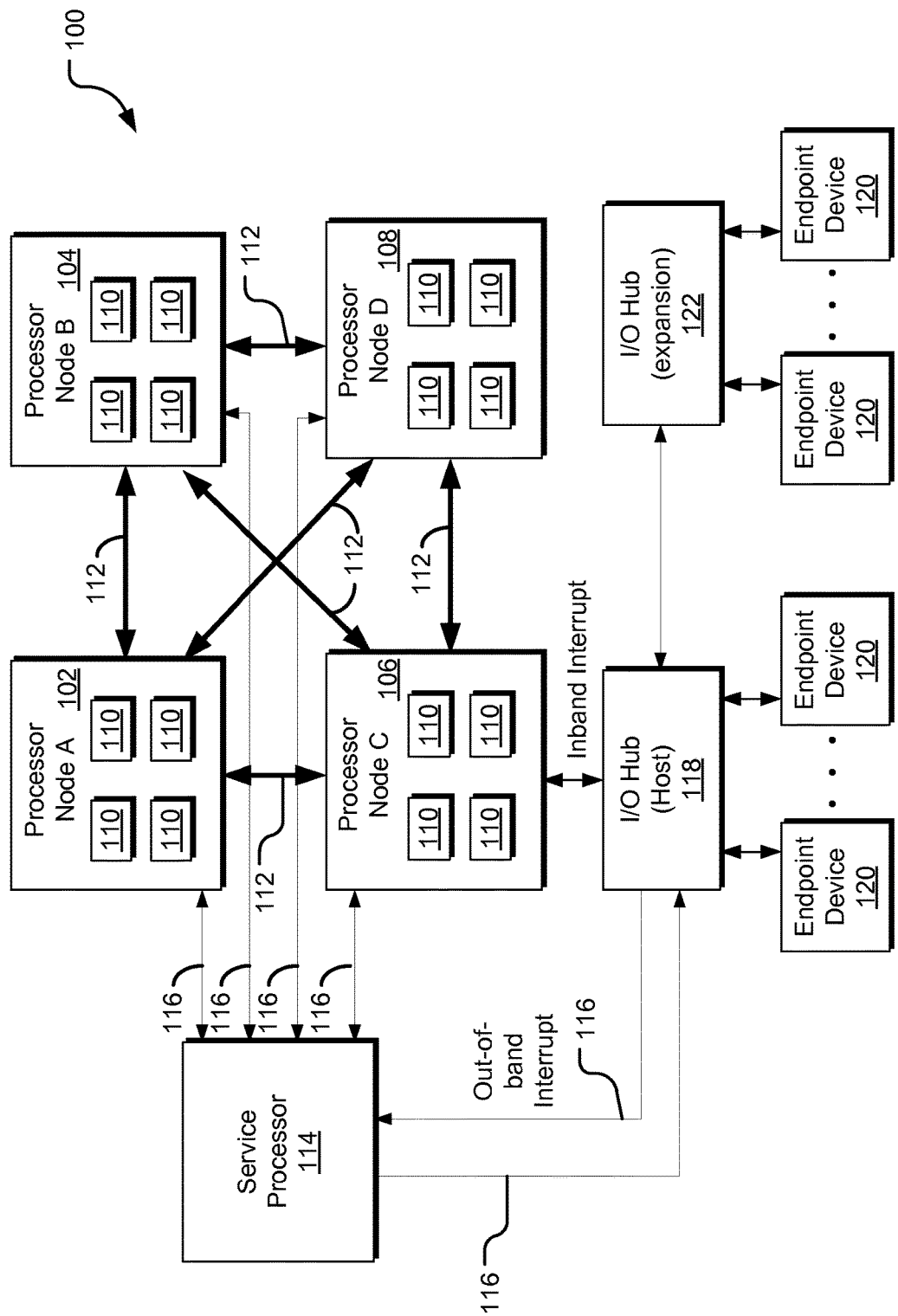
FIG. 1 is a schematic diagram illustrating an example of a computing system, such as a multi-node server, which may be used in implementing embodiments of the present disclosure.

Beginning in FIG. 1, a schematic diagram illustrating an example of a computing system, such as a multi-node server, which may be used in implementing embodiments of the present disclosure is shown. The diagram of FIG. 1 is a general multi-node, multi-core computing system, such as a multi-node server for hosting one or more GOS web applications. In general, the system 100 of FIG. 1 offers processing features for the one or more external devices and applications.

As shown in FIG. 1, a plurality of processor nodes 102-108 are present in the multi-node system. In particular, the system 100 of FIG. 1 includes four nodes, node A 102, node B 104, node C 106 and node D 108. Although only four processor nodes are shown, the system 100 may include any number of processing nodes. In addition, each node has a plurality of cores 110, with each core including a plurality of operational threads, such as eight threads. Although shown in FIG. 1 as include four cores 110 per processing node 102-108, each node may include any number of cores, each executing any number of operational threads. In this manner, the system 100 provides multiple processing nodes with multiple cores node and multiple threads per core. In addition, each node 102-108 communicates with each other node through communication lines 112, also known as coherency links.

Also included in the system 100 is a service processor component 114. The service processor 114 is a component of the system used for housekeeping, system initialization, environmental monitoring and error handling. As such, the service processor 114 typically operates at a lower speed and has less processing power than the processing nodes 102-108 of the system. However, because the service processor 114 is separate from the processor nodes 102-108 of the system, it can handle some errors of the system that occur within the processor nodes or that may negatively impact the processor nodes. In this manner, the service processor may operate as a back-up for error handling within the system for those more severe errors that are best not handled by the processor nodes.

As stated above, the service processor may operate at a lower speed than the processor nodes 102-108. Thus, the service processor is connected to each processor node (and input/output hub discussed below) through a low speed serial connection, shown in FIG. 1 as connection 116. Such connections may use any type of serial signaling protocol, such as 120 or Synchronous Serial Interface (SSI). In general, any type of signaling protocol may be used for the connections 116 between the service processor 114 and the other components of the system.

As mentioned above, the system allows for multiple GOSs to connect to and utilize the processing features of the multi-node system 100, including external I/O devices such as storage and networking devices. To give the GOSs service to these I/O devices, one or more input/output (I/O) hubs 118 may be connected to one or more of the processing nodes 102-108. As shown in FIG. 1, an I/O hub 118 is connected to processor node C 106. In other embodiments, other I/O hubs may be connected to the other processor nodes. Further, any number of I/O hubs may be connected to each processor node. The I/O hub 118 provides an interface between the processor node 106 and one or more I/O endpoint devices 120 and/or applications utilizing the system 100. Thus, as shown in FIG. 1, a plurality of endpoint devices 120 are connected to the I/O hub 118 for communication to the processing node 106. In one embodiment, the endpoint devices 120 communicate with the I/O hub 118 using a Peripheral Component Interconnect Express (PCI Express) signaling protocol. However, as contemplated, the endpoint devices 120 may communicate with the system 100 through any known or hereafter developed signaling protocol.

In some embodiments of the multi-node system 100, additional endpoint devices 120 may be connected or otherwise associated with the processor nodes 102-108 through an I/O hub expansion unit 122 in communication with the I/O hub host 118. In general, the I/O expansion unit 122 is similar to the I/O host unit 118, such that one or more endpoint devices 120 may communicate with the I/O host unit 118 through the I/O expansion unit 122. In this manner, the collection of various endpoint devices 120 associated with a processor node 106 is scalable through the connection of one or more I/O expansion units 122 connected in a daisy chain fashion to the I/O host unit 118.

As can be appreciated, a system 100 such as that shown in FIG. 1 may encounter many hardware fault-induced (e.g. parity or ECC errors) or software programming errors (e.g. mis-programmed routing tables) that are handled by the system. The I/O subsystem itself may encounter errors that are signaled to the appropriate layer of software for handling by the system. Ideally, errors and the resulting interrupt routines would be handled by one of the operations threads of the system, as the threads operate at a high speed in comparison to the service processor. These errors are transmitted "in-band" over the connection between the I/O hub 118 and the associated processor 106. However, the I/O hub is often unaware of the processes being handled by any one thread such that transmitting an error to a thread may result in a bottleneck effect at the thread. Another approach is to send all of the errors to the service processor 114 for handling. These errors are transmitted "out-of-band" over the connection between the I/O hub 118 and the service processor 114. However, because the service processor 114 generally operates at a lower speed than the processor nodes, it cannot handle the same number of errors simultaneously. To address these issues, the system illustrated in FIG. 2 provides for flexible and programmable steering of errors to particular destinations within the system based at least on the type of error.

Figure 2:
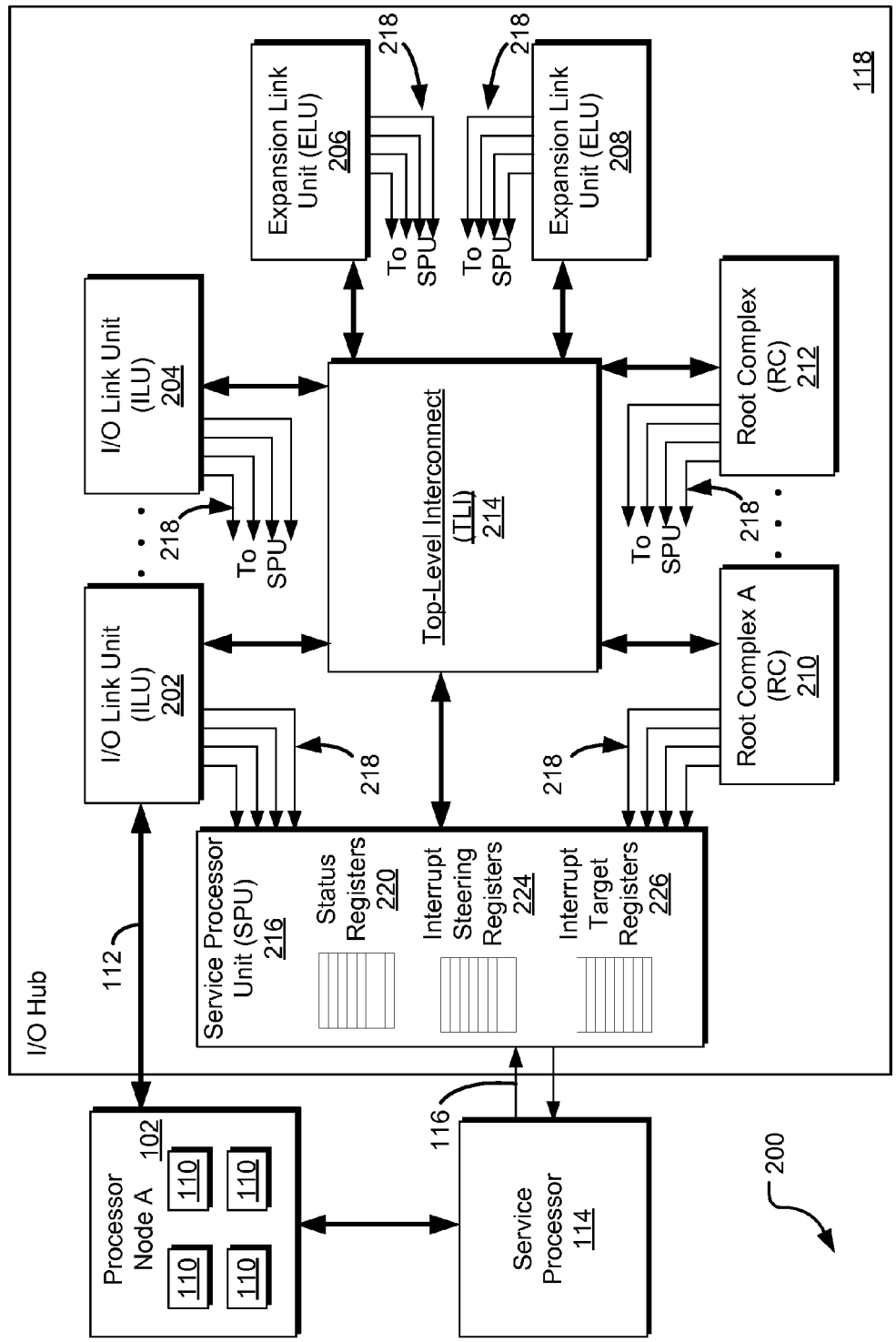
FIG. 2 is a schematic diagram illustrating an input/output (I/O) Hub component of the schematic of FIG. 1.

FIG. 2 is a schematic diagram illustrating an input/output (I/O) Hub component of the schematic of FIG. 1. The I/O hub 118 of FIG. 2 is the same or similar to the I/O hub of FIG. 1. Thus, the I/O hub 118 of FIG. 2 may be the host I/O hub or an expansion I/O hub as illustrated in FIG. 1. In addition, the I/O hub 118 is connected to a service processor 114 and at least one processor node 102 as shown in FIGS. 1 and 2. Further, the processor node 102 is similar to the processor node of FIG. 1 and includes one or more cores with one or more operating threads per core. In particular, the I/O hub 118 is connected to the I/O hub through connection lines 116 and to the processor node through connection 112.

The I/O hub 118 of the present disclosure includes several components. For example, in the embodiment illustrated in FIG. 2, the I/O hub 118 includes one or more I/O link units (ILU) 202-204 for connecting the I/O hub 118 to one or more processor nodes 102 of the system. One or more expansion link units (ELU) 206-208 are also included to connect the I/O hub to expansion I/O hub units, as shown in FIG. 1. One or more root complex units (RC) 210-212 are also included for connecting the I/O hub 118 to one or more endpoint devices, as also shown in FIG. 1. Each component of the I/O hub 118 may include one or more core transaction processing devices to perform the one or more operations associated with each component. In addition, each component of the I/O hub 118 is interconnected with each other component through a top-level interconnect (TLI) 214 such that each component can transmit messages or instructions to each other component of the I/O hub 118.

Also included in the I/O hub 118 is a service processor unit (SPU) 216. The SPU 216 connects to and communicates with the service processor 114 of the system through the communication lines 116. In addition, the SPU 216 is connected to each component of the I/O hub 118 through one or more error communication paths 218 from each component of the I/O hub to the SPU. The number of error communication paths 218 from each component to the SPU 216 depends on the number of types of errors the system is designed to report, as explained in more detail below. As illustrated in FIG. 2, each component of the I/O hub 118 includes four error communication paths 218 to the SPU 216 for reporting four different types of errors. However, the system 200 may include fewer or more error communication paths 218 to transmit fewer or more error types to the SPU 216.

In addition to connecting to the service processor 114 and receiving transmitted errors from the components of the I/O hub 118, the SPU 216 also includes and maintains one or more registers for use by the I/O hub and the system 200 when handling errors that occur within the system. In the embodiment illustrated in FIG. 2, the SPU 216 includes at least one error status register 220 configured to store errors that occur within the system 200 and are reported to the SPU. An interrupt steering register 222 is also included and is configured to steer the error to either the service processor 114 or to a core within a processor node 102 for handling the interrupt routine. Further, a interrupt target register 224 may also be included configured to store a target destination for those errors intended for the processor node 102 for handling. The operation of the registers of the SPU 216 when an error occurs is described in more detail below with relation to the flowcharts of FIGS. 3-6. In general, the registers 220-224 of the SPU 216 may be any type of register for storing bits of information, including read-only or writable registers. Further, the registers 220-224 may include any number of addressable locations within the registers as needed for the reporting, storing and handling of errors that occur within the multi-node computer system 100 of FIG. 1.

During description of the operations of the system in relation to the flowcharts of FIGS. 3-6, reference is made to the SPU 216 of FIG. 2. However, it should be appreciated that the operations may be performed and executed on any type of computing system where errors occur. In addition, while the operations are described below as performed by one or more specific components of the system 200, it should be appreciated that any of the components that includes a processing device may perform any of the operations described herein. Also, the operations may be performed through the use of hardware, software, or a combination of both hardware and software. The various software programs or hardware logic devices that may be utilized to perform the operations described herein are known to those of ordinary skill in the art.

Figure 3:
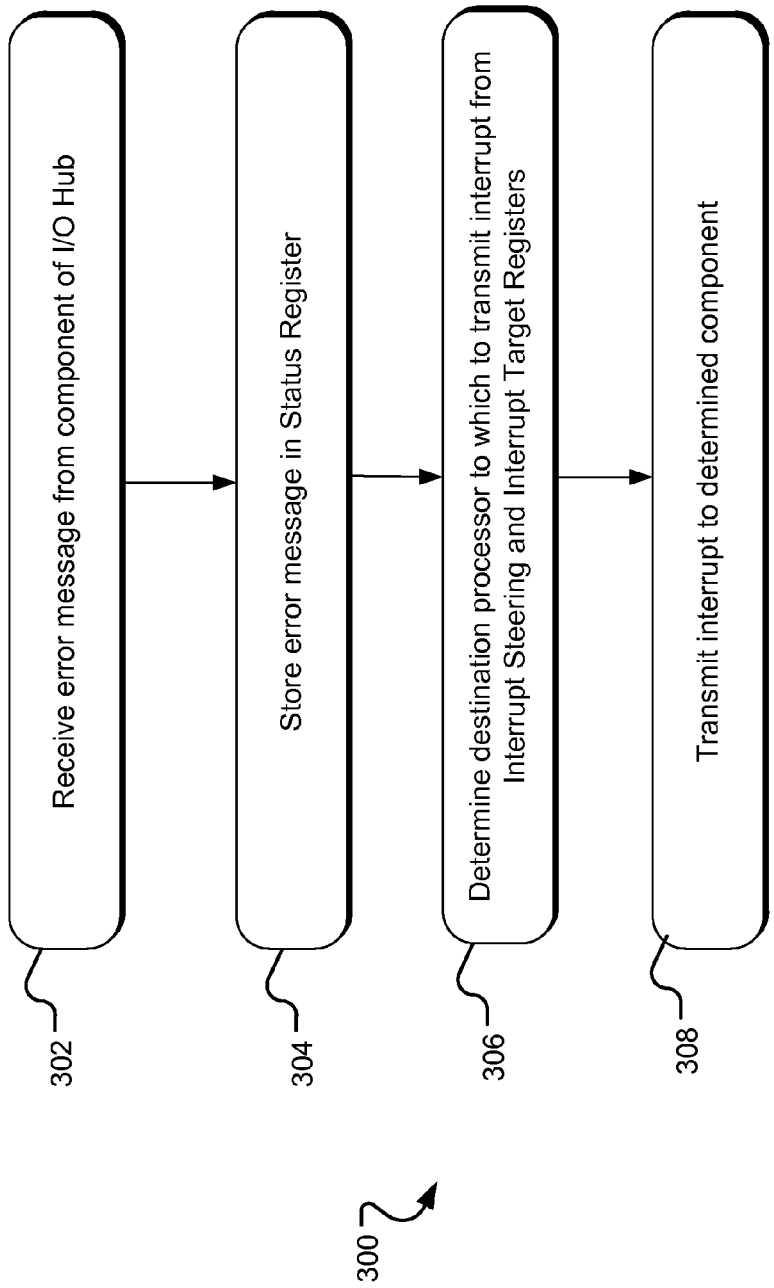
FIG. 3 is a flowchart of a method for receiving an error and transmitting an interrupt to a service processor or a destination processor node by utilizing the service processor unit of FIG. 2.

FIG. 3 is a flowchart of a method for receiving an error and transmitting an interrupt utilizing the SPU 216 of FIG. 2. The operations of the method of FIG. 3 may in general, however, be performed by any one component of the system 200 that has a processing device or by a combination of any plurality of components of the system. Beginning in operation 302, an error occurs within one of the components of the system 200. Although the description used throughout will be concerned with an error that occurs in RCA 210, the operations apply to an error occurring in any component of the system 200.

Upon the occurrence of an error in RCA 210, a signal is transmitted on one or more of the error communication paths 218 between RCA and the SPU 216. In particular, each error communication path 218 represents one bit in an error type signal transmitted when an error occurs. The assertion on one of the error communication paths 218 indicates the occurrence of a type of error within the associated component. In the embodiment illustrated in FIG. 2, four types of errors may be reported as there are four error communication paths 218 from each component to the SPU 216. In one example, the four types of errors that may be reported are non-fatal errors, core-fatal errors, chip-fatal errors and system-fatal errors. However, in other embodiments, more or fewer error types can be reported as more or fewer error communication paths 218 are included in the design of the system 200. In addition, other types of errors may be reported besides the four examples provided herein. These dedicated error communication paths 218 are utilized to report the errors rather than the TLI 214 of the I/O hub 118 as the TLI itself may also have errors that impede the proper reporting of errors occurring in the system 200.

As mentioned, the assertion of a signal on any of the error communication paths 218 indicates the occurrence of a type of error within the associated component. Thus, upon the occurrence of an error, the component (or more particular the core processor of the component) would analyze the error and, through the execution of a hardware state machine (or even a software program if the core executes software or firmware), assert one of the error communication paths 218 to indicate the occurrence of a type of error within the component. For example, the error that occurred in the component may be determined to be a non-fatal error such that the component would assert one of the error communication paths 218 to the SPU 216. If the analyzed error was a different type of error, such as a chip-fatal error, a signal on a different error communication path 218 from the component to the SPU 216 would be asserted. In this manner, the component utilizes the error communication paths 218 to signal the type of error that occurs in the component to the SPU 216.

In operation 304, the SPU 216 stores the received type of error in the status register 220. More particularly, the signals on each of the error communication paths 218 is stored in the status register 220 of the SPU 216. As mentioned above, an asserted signal on an error communication path 218 to the SPU 216 indicates a type of error has occurred at a component of the I/O hub 118. In the example shown in FIG. 2, four error communication paths 218 are provided from each component to the SPU 216. Thus, each entry in the status register 220 may correspond to a component of the I/O hub 118, with each bit stored in each entry associated with one of the error communication paths 218. For example, an entry in the status register may be associated with a particular component of the I/O hub 118 and may store the signals received from the error communication paths 218 from that component. If no error is detected in the particular component, the error communication paths 218 would all be deasserted and the resulting bit string "0000" is stored in the entry in the status register 220. Upon the occurrence of an error in the particular component, one or more of the error communication paths 218 is asserted and the associated entry in the status register 220 would also change. For example, the entry may become "0010" to indicate the asserted error communication path 218 from the particular component. In addition, the placement of the asserted bit within the stored bit string indicates the type of error that occurred in the component. As each component of the I/O hub 118 that provides error communication paths 218 to the SPU 216 may have an entry in the status register 220, a "snapshot" or summary of the errors that have occurred within the components of the I/O hub 118 thus is stored in the status register 220 of the SPU 216 and available for error handling software (running on the service processor or on a server processing node) to read.

In another embodiment of the system 200, the SPU 216 may include several status registers 220 for storing error states of the components of the system. In one example, the SPU 220 may include two status registers 220, one for storing non-fatal and core-fatal errors and another for storing chip-fatal and system-fatal error. In general, the status registers 220 may be any number of registers for storing any number of error types, as desired by the system 200. As explained in more detail below, the status registers 220 may be read by one or more processing devices of the system 200 during an interrupt routine or handling of an error to determine the location and type of error.

In operation 306, the SPU 216 determines a component of the system to perform one or more interrupt routines in response to the generated error. In particular, the SPU 216 utilizes the interrupt steering register 222 and/or the interrupt target register 224 of the SPU to determine what component of the system 200 an interrupt instruction is transmitted in response to the generated error. Initially, to address the generated error, the SPU 216 determines whether the error is handled out-of-band by the service processor 114 and/or in-band by one of the operating threads of the node processor 102. In one embodiment, this determination is based at least on the type of error reported and stored in the status register. Although described herein as based on the type of error reported, it should be appreciated that the decision by the SPU 216 to handle the error out-of-band or in-band may be based on any status or configuration of the error and the system in general.

In the embodiment of the system 200 where the handling component is based at least on the type of error, the interrupt steering register 222 includes stored entries that indicate such a handling component. In particular, the interrupt steering register 222 includes an entry that corresponds to an entry in the status register 220. The entry in the interrupt steering register 222 comprises two bits, an out-of-band indication bit and an in-band indication bit. If the out-of-band indication bit is asserted as stored in the entry in the interrupt steering register 222, then an indicated error in the corresponding status register 220 would result in the error handling being performed by the service processor 114. In such a case, a signal is provided to the service processor 114 over communication line 116 to begin the interrupt routine of the service processor in response to the error. Similarly, if the in-band indication bit is asserted as stored in the entry in the interrupt steering register 222, then an indicated error in the corresponding status register 220 would result in the error handling being performed by an operating thread of one of the cores 110 of a processor node 102. In such a case, a signal is provided to the operating thread over communication line 112 from the ILU 202 connected to the processor node 102 to begin the interrupt routine of the operating thread in response to the error. In some circumstances, such as in chip-fatal type errors where the state of the entire I/O hub may be comprised, both bits of the entry in the interrupt steering register 222 may be asserted for delivery of the interrupt signal to both the service processor 114 (a more reliable by slower path) and an operating thread (a faster but potentially less reliable path).

Through the interrupt steering register 222, the system 200 may steer a received error to a particular component of the system for handling. This provides flexibility to the system 200 for error handling over conventional systems that utilize just a service processor or a single dedicated operational thread of the system to handle all errors. To that end, the entries in the interrupt steering register 222 may be programmed by the system 200. In one embodiment, the entries are programmed at the start-up of the system 200. However, as explained in more detail below with reference to FIG. 5, the entries of the interrupt steering register 222 may be altered at any time during operation of the system 200. By programming the interrupt steering register 222 entries, the system 200 may not only determine which component of the system handles the errors from a particular component of the I/O hub 118, but may also steer the error handling to components based on the type of error received and stored in the status registers 220.

As described, upon the occurrence of an error in a component of the I/O hub 118, an error indicator is provided over one or more of the error communication lines 218 to the SPU 216. The SPU 216 stores the error indicator in an entry in the status register 220 that corresponds to the component on which the error occurred. In addition, the SPU 216, utilizing a stored entry in the interrupt steering register 222, may determine whether the error handling occurs out-of-band (by the service processor 114) or in-band (by one or more operating threads of a processor node 102) of the system 200. In the situation where the interrupt steering register 222 indicates that the interrupt signal is to be transmitted in-band to one of the processing nodes 102, the SPU 216 may access the interrupt target register 224 of the SPU to determine which particular operational thread the interrupt is transmitted.

The interrupt target register(s) 224 include one or more entries that indicate the destination of a transmitted interrupt from the SPU 216. In particular, the entries indicate the processor node, the particular core on the processor node and/or the particular operational thread on the particular core. Any number of entries may be included in the interrupt target register 224, with more entries providing a more specific target steering scheme. For example, the register 224 may include an entry for each type of error for each component of the system 200. In another example, the register 224 may include an entry for each type of error, regardless of the particular component from which the error is received. In general, the specificity of the interrupt target register 224 may be based on any number of factors of the system 200.

Similar to the interrupt steering register 222, the interrupt target register 224 may be programmable by the system 200, such as at start-up of the system. Also, similar to the interrupt steering register 222, the interrupt target register 224 may be programmable during operation. The flexibility provided by the system 200 to steer the interrupt to a particular destination is further described below with reference to FIG. 5.

Utilizing the interrupt steering register 222 (to determine if the interrupt is transmitted out-of-band to the service processor 114 or in-band to a processor node 102 based on the component and type of error) and the interrupt target register 224 (to determine a destination component and/or thread for in-band interrupts), the SPU 216 determines which component receives the interrupt. Thus, in operation 308 of FIG. 3, the SPU 216 transmits an interrupt to the selected component and destination based on the component with an error and the type of error that occurs. In this manner, the interrupts that occur as a result of an error may be steered to a particular component based on the type of error, rather than always being handled by a particular component or thread. The interrupt routine that is performed by the component or thread that receives the interrupt is described below with relation to FIG. 4.

Figure 4:
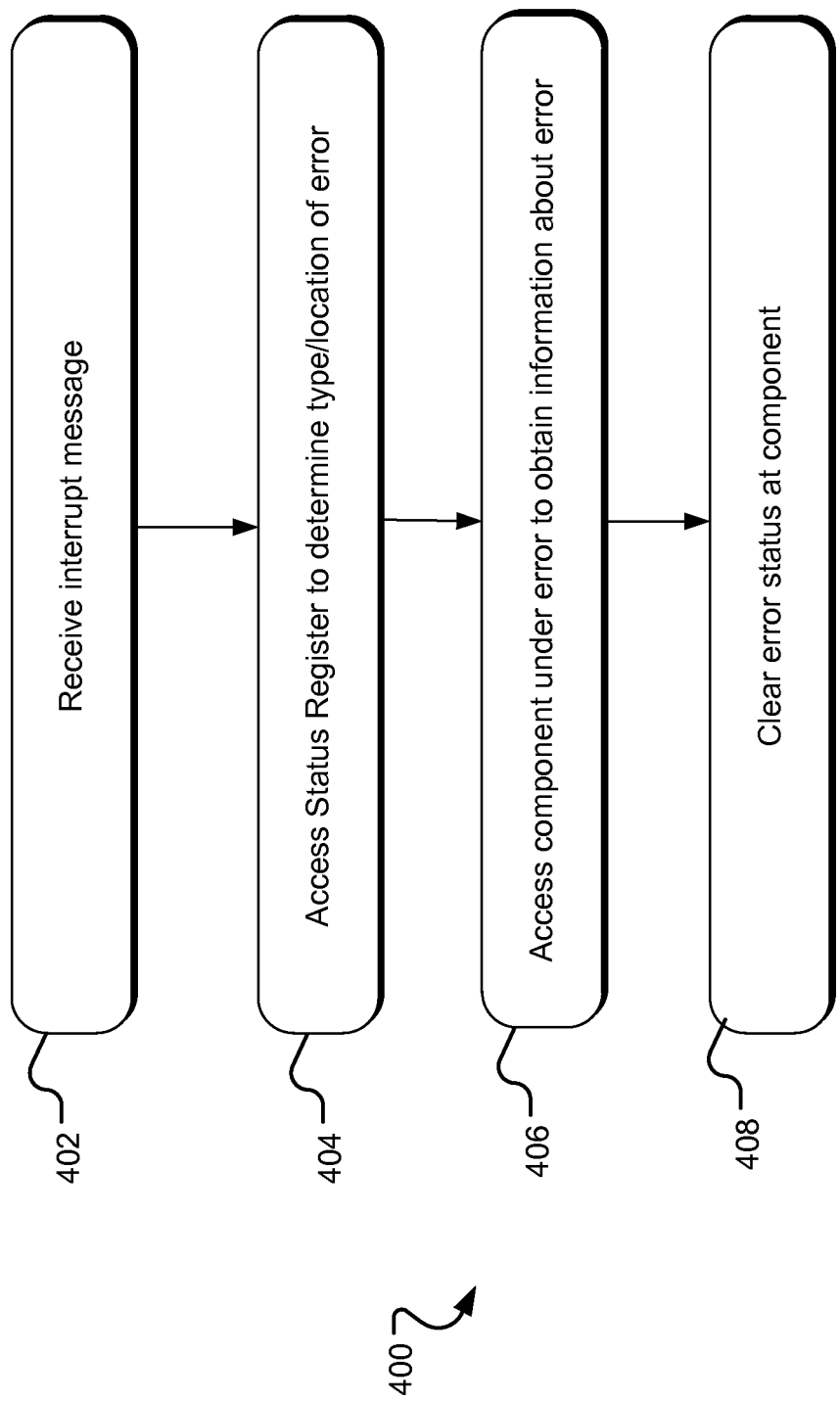
FIG. 4 is a flowchart of a method for receiving an interrupt and performing an interrupt routine utilizing the service processor unit of FIG. 2.

FIG. 4 is a flowchart of a method for receiving an interrupt and performing an interrupt routine utilizing the service processor unit of FIG. 2. The operations of the method of FIG. 4 may be performed by any one component of the system 200 that has a processing device or combination of any plurality of components of the system. In particular, the operation are performed by a component of the system 200 that receives an interrupt from the SPU 216 in response to an error on a component of the I/O hub 118.

Beginning in operation 402, the error handling component receives the interrupt message from the SPU 216. As described above, the SPU 216 through the use of one or more registers, determines which component of the system should receive an interrupt in response to an error in a component of the I/O hub 118. In particular, the interrupt signal is transmitted to the service processor 114 and/or one of the processor nodes 102 of the system 200. Thus, in operation 402, the determined component or operational thread receives the interrupt in response to an error in a component of the I/O hub 118.

In operation 404, the selected component for handling the error in the I/O hub 118 component begins an interrupt routine to address the occurred error. Initially, the selected component accesses the status register 220 to determine the location and type of error that was reported. As mentioned above, the status register 220 maintains the status of errors in the components of the I/O hub 118. Thus, by accessing the register 220, the selected component can determine the component from which the error was generated and the type of error that occurred. In an alternate embodiment, this information may be transmitted to the selected component by the SPU 216 along with or as part of the interrupt signal. Regardless of the embodiment used, the selected component to handle the interrupt obtains component information associated with the error for further processing of the interrupt routine.

With the obtained component and error information, the selected component then accesses the component to obtain more detailed information about the error in operation 406. In general, one or more of the components of the I/O hub 118 that includes a processing device may store information about an error that occurs within the component. Such error information may include a portion of the component that the error occurred, a memory location if the error is memory-specific, a syndrome or information to aid in the correction of the error if the error is correctable, a general type of error and the like. With this information, a system 200 may begin to take measures to address and respond to the errors, such as reading statuses and log registers of the component, querying external devices, performing device-level, core-level and/or chip-level resets, making configuration changes to the system, and the like. Thus, as the error information is obtained from the component with an error, the system 200 can begin to remedy the error and attempt to restore the I/O hub and its connected I/O endpoint devices to a normal operating state.

In addition, the error handling performed by the system may include clearing or resetting the error status of the component, as in operation 408. Generally, the resetting occurs after the error has been handled by the system 200 through the error handling routine. Further, because the component with an error reports an error status to the SPU 216 through the one or more error communication lines 218, the clearing of the error status at the component during the error handling routine also returns the associated error status in the status register 220 of the SPU to a non-error state. In one embodiment, the clearing of the error in the component would be transmitted to the status register 220 entry and a bit string of "0000" is thus restored. At the occurrence of another error in the component, the bit string in the entry would be altered accordingly as the error is transmitted to the SPU 216 by the error communication lines 218.

Figure 5:
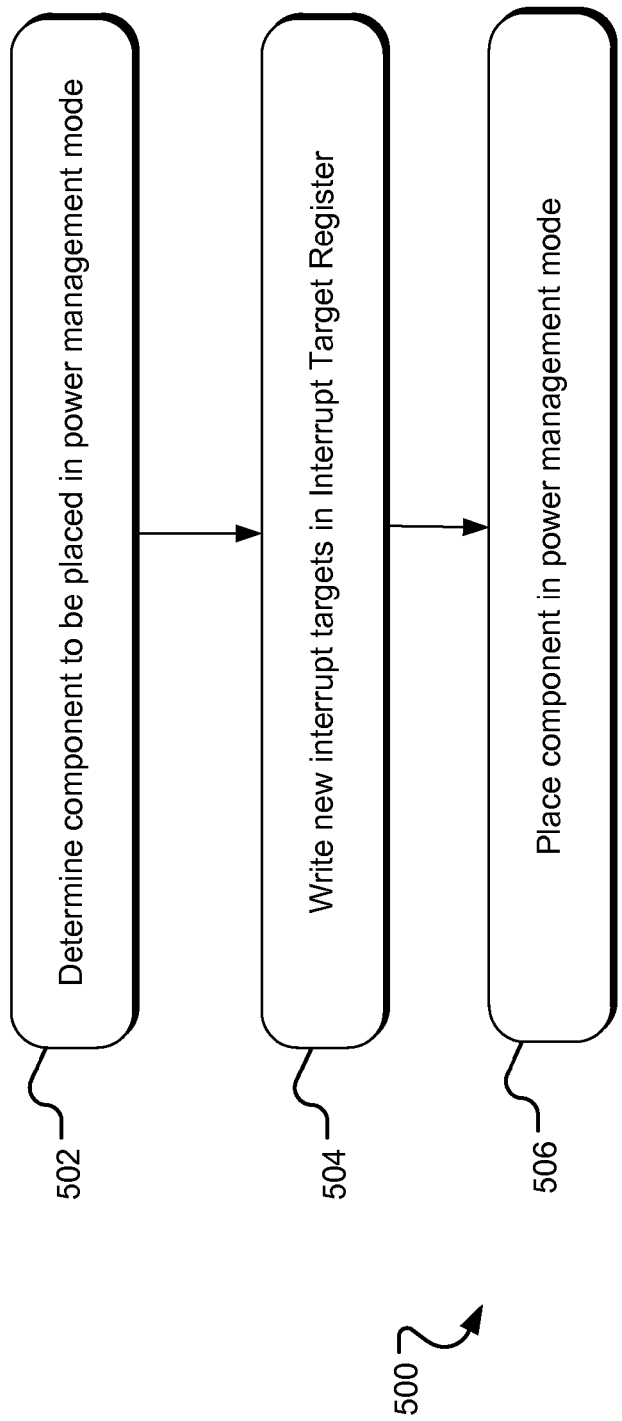
FIG. 5 is a flowchart of a method for utilizing the service processor unit of FIG. 2 to adjust an interrupt target when utilizing power saving techniques in the system of FIGS. 1 and 2.

As mentioned above, the present disclosure provides for the steering of interrupts and the error handling routine to specific components of the system 200 for a more flexible, faster and more reliable error handling. In one embodiment, the selection of the component to perform the error handling routine may be altered as operating conditions of the system alters. In particular, FIG. 5 is a flowchart of a method for utilizing the service processor unit of FIG. 2 to adjust an interrupt target when utilizing power saving techniques in the system of FIGS. 1 and 2. The operations of the method of FIG. 4 may be performed by any one component of the system 200 that has a processing device or combination of any plurality of components of the system. In particular, the operations may be performed by a processing component of the system 200 responsible for system management, such as the service processor 114. In addition, the operations may be executed through hardware, software or a combination of both hardware and software.

Beginning in operation 502, the system 200 places a processor node of the system into a power management mode. In general, placing a processor node into a power management mode logically removes the node from the system so that the node can consume less power. This may occur during observed periods of low processing needs to save power consumption of the system 200. Those of skill in the art will recognize the various methods by which a processor node, core or operating thread of the system 200 may be placed in a power management mode.

As mentioned above, however, some error handling routines of the system 200 may occur within a processing node of the system. In those systems that dedicate a thread or core to handle all errors, the thread or core cannot be placed in a power management mode as the thread or core must remain operational to account for errors in the system. To address this issue, the present disclosure allows for the component of the system that is slated to handle errors to be altered in response to one or more conditions of the system, such as a processor node entering a power management mode. Thus, in operation 504, the system 200 may assign a new target component for handling one or more errors that may occur in the system 200 to account for a component entering a power management mode. In particular, the system 200 writes a new target into the target interrupt register 224 in the SPU 216 corresponding to the thread, core and/or processing node that will handle one or more of errors that occur in the system. In addition, the system 200 may alter the entries in the interrupt steering registers 222 to steer interrupts to either the service processor 114 or the designated processing node for error handling. Once the new target or targets are stored in the interrupt target register 224, the system 200 places the processor node in power management mode in operation 506.

In this manner, the system 200 can account for changes in the operation of the system 200. Although the example provided above with relation to FIG. 5 concerns placing a processing node in a power management mode, the system may perform similar operations for any logical change to the system. For example, if an error occurs within the system that calls for the system to logically partition out or remove a component, the system can account for the change in logical structure by designating another component for error handling. In another example, the system 200 may monitor the performance of the components of the system and adjust the target component for error handling accordingly. Thus, if a designated processor node is burdened with a complex processing task or exceeds some processing threshold value, the error handling may be shifted over to another component of the system until the complex processing task is completed. After the task is completed, the designation of error handling may be transferred back to the original core, or remain with the newly assigned core until that core encounters a complex processing task. In this manner, the designation of a processing node for handling errors in the I/O hub may be altered based on the processing needs of the system at any one time.

Regardless of the reasons behind the error handling shift, the system is capable of altering the destination and handling of errors that occur within the I/O hub through the use of the SPU 216 and associated registers. This ability to alter the error handling of the system during operation of the system allows for a more flexible system for error handling than previously envisioned.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A multi-node computing device comprising:
a plurality of processing nodes, each processing node comprising a plurality of processing cores;
a service processor in communication with at least one of the plurality of processing nodes; and
an input/output (I/O) hub electrically connected to the at least one of the plurality of processing nodes and the service processor and configured to connect to at least one external component of the I/O hub, the I/O hub comprising:
a status register configured to store a plurality of error status messages, wherein each of the plurality of error status messages corresponds to one of a plurality of components of the I/O hub; and
an interrupt steering register configured to store a plurality of indicators of a destination component for transmission of an interrupt signal, each of the plurality of indicators corresponding to one of the error status messages stored in the status register, wherein each of the plurality of indicators of a destination component indicates the service processor or the at least one of the plurality of processing nodes such that the interrupt signal is transmitted to the destination component based at least on a one of the plurality of indicators of the destination component corresponding to the one of the error status messages of the status register.

2. The multi-node computing device of claim 1 further comprising a plurality of error communication lines, wherein each of the plurality of error communication lines electrically connects one of the plurality of components of the I/O hub to the status register.

3. The multi-node computing device of claim 2 wherein the error status messages corresponding to one of the plurality of components of the I/O hub comprises a bit string and wherein an asserted bit in the bit string indicates a type of error occurring at the one of the plurality of components of the I/O hub.

4. The multi-node computing device of claim 3 wherein the type of error occurring at the one of the plurality of components of the I/O hub is one of non-fatal error, core-fatal error, chip-fatal error and system-fatal error.

5. The multi-node computing device of claim 1 wherein the I/O hub further comprises an interrupt target register configured to store at least one indicator of an interrupt target destination of the at least one of the plurality of processing nodes for receiving the transmission of the interrupt signal.

6. The multi-node computing device of claim 5 wherein the at least one indicator of an interrupt target destination of the at least one of the plurality of processing nodes for receiving the transmission of the interrupt signal comprises an indication of a target processor, an indication of a target core and an indication of a target operational thread.

7. The multi-node computing device of claim 1 wherein the I/O hub further comprises:
at least one root complex component configured to interface with the at least one external component and wherein the I/O hub provides processing services to the at least one external component through the at least one root complex component.

8. The multi-node computing device of claim 1 wherein the I/O hub further comprises:
at least one I/O link component configured to electrically connect the I/O hub to the at least one of the plurality of processor nodes.

9. The multi-node computing device of claim 1 wherein the plurality of indicators of a destination component for transmission of an interrupt signal in the interrupt steering register is loaded by the at least one of the plurality of processor nodes during an initialization programming sequence of the multi-node computing device.

10. The multi-node computing device of claim 6 wherein the at least one indicator of an interrupt target destination of the at least one of the plurality of processing nodes for receiving the transmission of the interrupt signal is loaded by the at least one of the plurality of processor nodes during an initialization programming sequence of the multi-node computing device.

11. A method for error handling in a multi-node computing device, the method comprising:
receiving an error status message from a component of the multi-node computing device, the error status message comprising a bit string with at least one asserted bit, the asserted bit indicating a type of error in the component of the multi-node computing device;
storing the error status message from the component in an error status register, the error status register comprising a plurality of entries and wherein each entry in the error status register corresponds to component of the multi-node computing device;
obtaining a destination component for transmission of an interrupt signal indicator from a interrupt steering register configured to store a plurality of indicators of a destination component, wherein each of the plurality of indicators corresponds to one of the plurality of entries in the error status register and each of the plurality of indicators of a destination component indicates a service processor component or a processing node of the multi-node computing device based at least on the error status message from the component; and
transmitting an interrupt signal to the destination component based at least on a particular one of the plurality of indicators of the destination component corresponding to a particular one of the error status messages of the error status register.

12. The method of claim 11 wherein, in the event the destination component indicates a processing node, the method further comprises:
accessing an interrupt target register configured to store at least one indicator of an interrupt target destination of the processing node for receiving the transmission of the interrupt signal.

13. The method of claim 12 wherein the at least one indicator of an interrupt target destination of the processing node for receiving the transmission of the interrupt signal comprises an indication of a target processor, an indication of a target core and an indication of a target operational thread.

14. The method of claim 11 wherein the type of error indicated by the bit string is one of non-fatal error, core-fatal error, chip-fatal error and system-fatal error.

15. The method of claim 11 wherein a number of bits in the bit string correspond to a plurality of error communication lines electrically connecting the component of an I/O hub to the error status register.

16. The method of claim 11 further comprising:
loading the plurality of indicators of a destination component into the interrupt steering register during an initialization programming sequence of the multi-node computing device.

17. The method of claim 12 further comprising:
loading the at least one indicator of an interrupt target destination of the processing node for receiving the transmission of the interrupt signal into the interrupt target register during an initialization programming sequence of the multi-node computing device.

18. The method of claim 17 further comprising:
replacing the at least one indicator of an interrupt target destination of the processing node for receiving the transmission of the interrupt signal in the interrupt target register with a replacement indicator of an interrupt target destination; and
placing a node of the multi-node computing device in a power saving mode.

19. The method of claim 18 further comprising:
analyzing a processing load of a node of the multi-node computing device; and
in the event the processing load exceeds a processing load threshold value, replacing the at least one indicator of an interrupt target destination of the processing node for receiving the transmission of the interrupt signal in the interrupt target register with a replacement indicator of an alternative interrupt target destination.

20. The method of claim 11 wherein the error status message is received from an input/output (I/O) hub component of the multi-node computing device, the I/O hub configured to connect to at least one external component of the I/O hub and provide processing services to at least one external component through the I/O hub.

* * * * *